United States Patent
Sharma et al.

(10) Patent No.: US 12,019,893 B2
(45) Date of Patent: Jun. 25, 2024

(54) STORAGE DEVICE POOL MANAGEMENT BASED ON FRAGMENTATION LEVELS

(71) Applicant: Western Digital Technologies, Inc., San Jose, CA (US)

(72) Inventors: Amit Sharma, Bangalore (IN); Dinesh Kumar Agarwal, Bangalore (IN)

(73) Assignee: Western Digital Technologies, Inc., San Jose, CA (US)

(*) Notice: Subject to any disclaimer, the term of this patent is extended or adjusted under 35 U.S.C. 154(b) by 80 days.

(21) Appl. No.: 17/851,595

(22) Filed: Jun. 28, 2022

(65) Prior Publication Data

US 2023/0418499 A1    Dec. 28, 2023

(51) Int. Cl.
*G06F 3/06* (2006.01)
*G06F 16/17* (2019.01)

(52) U.S. Cl.
CPC .......... *G06F 3/0644* (2013.01); *G06F 3/0608* (2013.01); *G06F 3/0688* (2013.01); *G06F 16/1724* (2019.01)

(58) Field of Classification Search
CPC .. G06F 3/0644; G06F 16/1724; G06F 3/0608; G06F 3/0688
See application file for complete search history.

(56) References Cited

U.S. PATENT DOCUMENTS

| | | | |
|---|---|---|---|
| 5,604,902 A * | 2/1997 | Burkes | ................ G06F 11/1076 |
| 7,886,115 B2 | 2/2011 | Sanvido et al. | |
| 8,032,689 B2 | 10/2011 | Kulkarni | |
| 8,725,934 B2 | 5/2014 | Batwara et al. | |
| 8,931,054 B2 | 1/2015 | Huynh et al. | |
| 8,966,191 B2 | 2/2015 | Flynn et al. | |
| 9,047,211 B2 | 6/2015 | Wood et al. | |
| 9,058,123 B2 | 6/2015 | Joshi et al. | |
| 9,122,579 B2 | 9/2015 | Flynn et al. | |
| 9,146,688 B2 | 9/2015 | Yang et al. | |
| 9,201,677 B2 | 12/2015 | Joshi et al. | |
| 9,251,086 B2 | 2/2016 | Peterson et al. | |

(Continued)

OTHER PUBLICATIONS

Mearian, Lucas, "A waste of space: Bulk of drive capacity still underutilized", Computerworld; Jul. 28, 2010; https://www.computerworld.com/article/2519639/a-waste-of-space--bulk-of-drive-capacity-still-underutilized.html; 9 pages.

*Primary Examiner* — Eric Cardwell
(74) *Attorney, Agent, or Firm* — LOZA & LOZA, LLP; Gabriel Fitch

(57) ABSTRACT

Aspects directed towards data storage management are provided. In one aspect, a data storage system receives fragmentation level information from data storage devices, and host data from a host device to be stored in the data storage devices. Based on the received fragmentation level information, a target data storage device is selected from the data storage devices, and the host data is sent to the target data storage device. In another aspect, a data storage device determines threshold conditions that trigger a defragmentation process. For this aspect, a fragmentation level metric indicating a proximity of the data storage device to initiating the defragmentation process is calculated based on the threshold conditions and a current amount of data stored in a non-volatile memory (NVM). The fragmentation level metric is then sent to a storage management device.

20 Claims, 12 Drawing Sheets

(56) References Cited

U.S. PATENT DOCUMENTS

| | | |
|---|---|---|
| 9,442,844 B2 | 9/2016 | Flynn et al. |
| 9,697,130 B2 | 7/2017 | Karippara et al. |
| 9,798,673 B2 | 10/2017 | Peterson et al. |
| 9,864,529 B1 | 1/2018 | Chen et al. |
| 9,875,033 B2 * | 1/2018 | Perez .................. G06F 3/061 |
| 10,013,354 B2 | 7/2018 | Flynn et al. |
| 10,073,656 B2 | 9/2018 | Zhe Yang et al. |
| 11,182,101 B2 | 11/2021 | Bazarsky et al. |
| 2014/0007189 A1 | 1/2014 | Huynh et al. |
| 2016/0314137 A1 * | 10/2016 | Dryfoos .............. G06F 16/1724 |

* cited by examiner

STORAGE DEVICE POOL MANAGEMENT BASED ON FRAGMENTATION LEVELS

FIELD

The subject matter described herein relates to data storage devices. More particularly, the subject matter relates, in some examples, to the management of a storage device pool based on fragmentation levels.

INTRODUCTION

Data storage devices, such as solid-state devices (SSDs), can be pooled into storage pools. This type of storage virtualization is used in various information technology (IT) infrastructures. In principle, a storage pool includes multiple storage devices pooled together to form a virtual storage pool (VSP), eliminating the need to communicate with each storage device individually and collectively providing larger overall capacity. VSPs offer many advantages such as effective utilization of various storage medias and ease of access to storage media. At the same time, the various SSDs in a VSP may have different firmware and/or hardware architectures.

Due to fragmentation, however, it should be noted that the logical capacity of SSDs in a VSP may not be the same as their actual physical capacities. For instance, a VSP may include three SSDs where each is logically using only 25% capacity, but where each is physically filled to varying capacities that may be more than 25% (e.g., 50%, 25%, and 75% capacity, respectively, possibly due to an accumulation of invalid data). Here, it should be noted that SSDs connected to a VSP may become fragmented (e.g., the accumulation of invalid data) for any of various reasons including, for example: routine SSD operations where data previously written becomes stale due to requested erasure or modification of the data at a new location; a data pattern written by a host; an internal device failure (e.g. a program failure); an internal device failure-avoidance scheme (e.g. higher error rate depicted by certain blocks); and/or an internal device cache management algorithm (e.g., an algorithm that decides how cached data is handled during device deep sleep or power down).

Once a device reaches a defragmentation threshold (e.g., a threshold to begin garbage collection at the SSD), a defragmentation process is triggered at the SSD, which moves valid data from a fragmented portion to a new physical location. This movement of data, however, can be undesirable for various reasons. For instance, defragmentation reduces the life of the device, as well as the throughput of the device during the defragmentation process. Such data movement also requires more NAND operations, which undesirably consume more power (i.e., since NAND operations are generally more power intensive) and generate more heat which is a key consideration for larger sized storage infrastructures.

Accordingly, improved techniques for making VSPs more efficient are desirable.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

One aspect of the disclosure provides a data storage system, including: a plurality of data storage devices each including a non-volatile memory (NVM), and a storage management device configured to: receive fragmentation level information from at least two of the plurality of data storage devices; receive host data from a host device to be stored in one or more of the plurality of data storage devices; select, based on the fragmentation level information from the at least two of the plurality of data storage devices, a target data storage device from the plurality of data storage devices; and send the host data to the target data storage device.

Another aspect of the disclosure provides a method for use with a data storage system including a storage management device coupled to a plurality of data storage devices each including an NVM, the method including: receiving fragmentation level information from at least two of the plurality of data storage devices; receiving host data from a host device to be stored in one or more of the plurality of data storage devices; selecting, based on the fragmentation level information from the at least two of the plurality of data storage devices, a target data storage device from the plurality of data storage devices; and sending the host data to the target data storage device.

Another aspect of the disclosure provides a data storage system, including: a plurality of data storage devices each including an NVM; means for receiving fragmentation level information from at least two of the plurality of data storage devices; means for receiving host data from a host device to be stored in one or more of the plurality of data storage devices; means for selecting, based on the fragmentation level information from the at least two of the plurality of data storage devices, a target data storage device from the plurality of data storage devices; and means for sending data to the target data storage device.

In another aspect of the disclosure, a data storage device is provided, which includes: an NVM and a processor coupled to the NVM in which the processor is configured to: determine threshold conditions that trigger a defragmentation process to be performed in the data storage device; calculate a fragmentation level metric based on the threshold conditions and a current amount of data stored in the NVM such that the fragmentation level metric indicates a proximity of the data storage device to initiating the defragmentation process; and send the fragmentation level metric to a storage management device.

DETAILED DESCRIPTION

Figure 1:
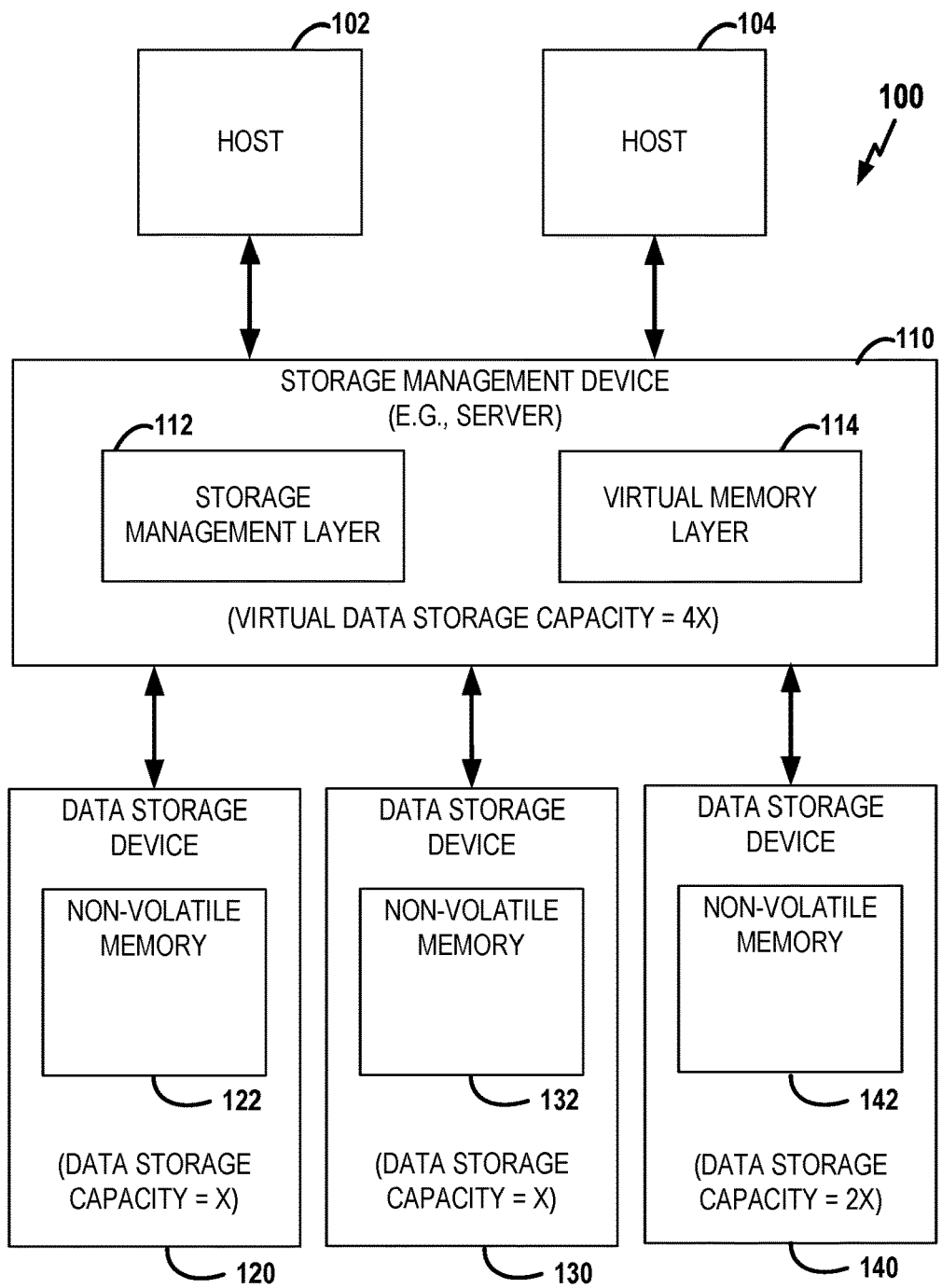
FIG. 1 is a schematic block diagram illustrating an exemplary data storage system in accordance with some aspects of the disclosure.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

The examples herein relate to data storage devices (DSDs) and to storage management devices coupled to DSDs. In the main examples described herein, data is stored within non-volatile memory (NVM) arrays. In other examples, data may be stored in hard disk drives (HDD) using magnetic recording. DSDs with NVM arrays may be referred to as solid state devices (SSDs). Some SSDs use NAND flash memory, herein referred to as "NANDs." A NAND is a type of non-volatile storage technology that does not require power to retain data. It exploits negative-AND, i.e., NAND, logic. For the sake of brevity, an SSD having one or more NAND dies will be used as a non-limiting example of a DSD below in the description of various embodiments. It is understood that at least some aspects described herein may be applicable to other forms of DSDs as well. For example, at least some aspects described herein may be applicable to phase-change memory (PCM) arrays, magneto-resistive random access memory (MRAM) arrays, and resistive random access memory (ReRAM) arrays.

Overview

Aspects of the disclosure relate to improved techniques for managing data storage device (DSD) pools, and in particular the management of DSD pools based on fragmentation levels. In a particular aspect disclosed herein, a storage management device (e.g., a server) is connected to DSDs of a virtual storage pool (VSP), where the storage management device is configured to increase the overall speed of the VSP, as well the lifespans of the individual DSDs of the VSP. For instance, it is contemplated that the storage management device may be configured to strategically select which DSDs to send write commands to ensure that all DSDs of the VSP are as equally fragmented as possible. Aspects are also disclosed in which the storage management device may be configured to control when to start defragmentation of the DSDs based on the status of the VSP as a whole. For instance, it is contemplated that the storage management device may be configured to modify the defragmentation thresholds of individual DSDs based on a combined storage capacity of the VSP.

Several advantages are provided by these improved techniques for VSP management. For example, these improved techniques can help avoid over cycling individual DSDs of a VSP, which results in fewer DSDs needing to be replaced. In addition, since the overall write implications of a VSP are reduced, less data needs to be moved within DSDs, which reduces the power and thermal cost of storage infrastructures and increases the lifespan of the VSP overall. The improved techniques disclosed herein also help to avoid various internal DSD operations (e.g., such as defragmentation/garbage collection processes), which result in a higher VSP throughput.

Exemplary Devices, Systems and Procedures

FIG. 1 is a schematic block diagram illustrating an exemplary data storage system 100 in accordance with some aspects of the disclosure. The data storage system 100 includes a storage management device 110 coupled to three DSDs 120, 130, and 140 along with two hosts 102, 104. The storage management device 110 can include, or be embodied as, a server, or other such device. The storage management device 110 may include a storage management layer 112 configured to manage a VSP that includes DSDs 120, 130, and 140. The storage management device 110 may also include a virtual memory layer 114 configured to provide hosts 102 and 104 with an abstraction of DSDs 120, 130, and 140 embodied as a VSP, where the capacity of the VSP (i.e., "4×") is the sum of the respective capacities of DSDs 120, 130, and 140 (i.e., "X", "X", and "2×"). Here, it should be appreciated that although FIG. 1 shows specific exemplary capacities for DSDs 120, 130, and 140, other suitable/relative capacities can be used in other embodiments. In one aspect, the VSP could include only two DSDs or more than three DSDs.

As illustrated, the storage management device 110 is coupled to hosts 102 and 104. The hosts 102 and 104 provide commands and data to the storage management device 110 for storage in the VSP that includes DSDs 120, 130, and 140. For example, the hosts 102 and 104 may provide write commands to the storage management device 110 for writing data to the VSP, or read commands to the storage management device 110 for reading data from the VSP. The hosts 102 and 104 may be any system or device having a need for data storage or retrieval and a compatible interface for communicating with the VSP. For example, the hosts 102 and 104 may be a computing device, a personal computer, a portable computer, a workstation, a server, a personal digital assistant, a digital camera, or a digital phone as merely a few examples. In one aspect, the system 100 can include more than or less than two hosts.

The DSDs 120, 130, and 140 can include, or be embodied as, one or more SSDs, and one or more other storage devices such as magnetic storage devices, tape drives, and the like. As illustrated, DSDs 120, 130, and 140 can each respectively include a non-volatile memory (NVM) 122, 132, and 142 configured to store data.

In a particular embodiment, the storage management device 110 is configured to receive fragmentation level information from the DSDs 120, 130, and 140; receive host data from a host device, 102 or 104, to be stored in one or more of the DSDs 120, 130, and 140; select, based on the fragmentation level information, one of DSDs 120, 130, and 140 as a target DSD; and send the host data to the target DSD in accordance with some aspects of the disclosure.

Utilizing Fragmentation Information to Select Target

In an aspect of the disclosure, it is contemplated that each of DSDs 120, 130, and 140 are configured to internally maintain various types of fragmentation information. When device fragmentation is beyond a certain threshold, a defragmentation process (e.g., garbage collection) is initiated. Defragmentation should generally be avoided, however, since device throughput decreases during defragmentation. Also, defragmentation increases write amplification and hence decreases the life span of a DSD. Here, it should be noted that a defragmentation process initiated by a DSD itself is different than a defragmentation process initiated by an operating system. Moreover, a defragmentation process initiated by a DSD is often referred to as "garbage collection" in a DSD, which is a common task performed by a DSD to free up NVM space, though generally undesirable since it tends to slow DSD performance and contributes to write amplification, as noted above.

In an aspect disclosed herein, it is contemplated that the storage management device 110 would be provided with fragmentation information from each of DSDs 120, 130, and 140 so that the storage management device 110 may implement better VSP management schemes. In a particular embodiment, each of DSDs 120, 130, and 140 calculates information pertaining to their current respective fragmentation levels, which can be provided to the storage management device 110 as an Approaching Defragmentation Factor (ADF). As used herein, an ADF is a metric corresponding to a particular DSD's fragmentation level, wherein the fragmentation level metric represents a proximity of the DSD (e.g., DSD controller) to initiating a defragmentation process on the NVM. Using ADFs can be especially desirable when there are DSDs that have different architectures, since an ADF can provide a standardized metric for determining the relative proximity of each DSD from initiating a defragmentation process. For instance, an ADF can be in the form of a number between 1-5, for example, wherein a "1" indicates that the DSD is relatively far from initiating a defragmentation process, a "3" indicates that the DSD is nearing a defragmentation process, and a "5" indicates that a defragmentation would be triggered on the next write to the DSD.

Since a DSD's fragmentation level will change over time, its corresponding ADF will also change dynamically. Therefore, within the context of the example illustrated in FIG. 1, it is desirable for the storage management device 110 to have an up-to-date ADF for each of DSDs 120, 130, and 140. Having frequent communications to obtain such information, however, could consume precious input/output (I/O) bandwidth of a VSP (i.e., since a VSP could have hundreds of DSDs plugged in).

To reduce the frequency of such communications, it is contemplated that a DSD can publish an appropriate threshold (e.g., quantity of data written) for when an ADF should be checked. Such a threshold would usually depend on a DSD's architecture and how its corresponding defragmentation algorithm works at a logical block size boundary (i.e., where logical block size would depend on the architecture/capacity of the DSD). In a particular embodiment, each of DSDs 120, 130, and 140 calculates information pertaining to how frequently each respective fragmentation level should be checked, which can be provided to the storage management device 110 as an "ADF frequency". As used herein, an ADF frequency is a frequency change metric corresponding to a particular DSD's fragmentation level, wherein each ADF frequency is indicative of a threshold amount of data that can be respectively written to each of DSDs 120, 130, and 140 before an expected increase in a corresponding ADF.

Figure 2:
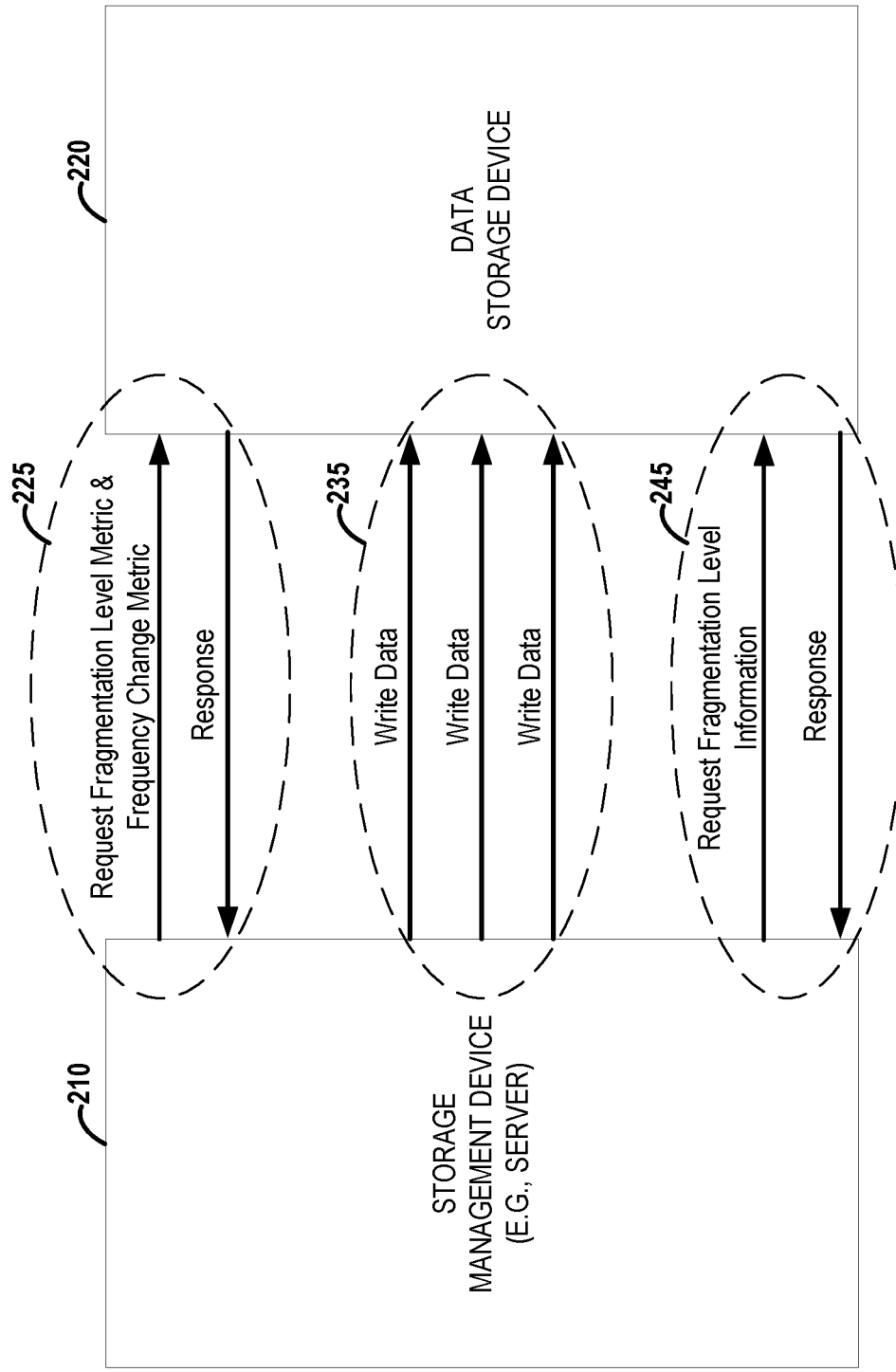
FIG. 2 is a schematic block diagram illustrating an exemplary communication between a storage management device and a data storage device (DSD) in accordance with some aspects of the disclosure.

FIG. 2 is a schematic block diagram illustrating an exemplary communication between a storage management device 210 and a DSD 220 in accordance with some aspects of the disclosure. As illustrated in FIG. 2, it is contemplated that a storage management device 210 could learn (e.g., send a request and receive a response for) the frequency change metric (i.e., ADF frequency) and initial fragmentation level metric (i.e., ADF) of a DSD 220 during initialization 225. Based on the ADF frequency ascertained (e.g., calculated by the DSD 220 and received by the storage management device 210) during initialization 225, the storage management device 210 may then determine a timing to request a subsequent ADF calculation from the DSD 220 (e.g., after 500 megabytes (MBs) of data has been written onto DSD 220). For instance, the storage management device 210 may monitor an amount of data that has been written 235 to DSD 220 during a period since a most recent ADF request. After the amount of data written meets or exceeds the ADF frequency amount, the storage management device 210 may then send a subsequent ADF request 245 to DSD 220 based on the monitored amount of data that has been written onto DSD 220 since a most recent ADF request (e.g., when the amount of data written to DSD 220 during the period encompassing write commands 235 exceeds 500 MB).

Figure 3:
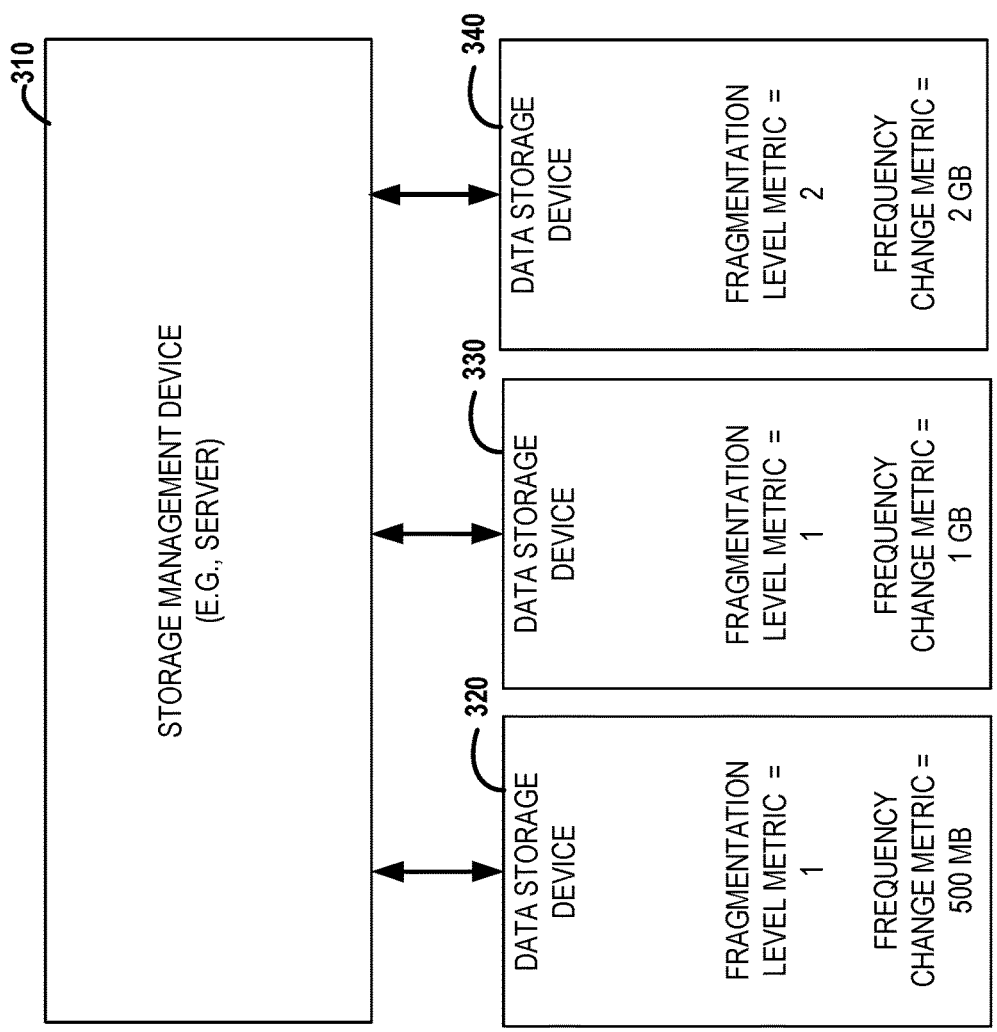
FIG. 3 is a schematic block diagram illustrating an exemplary fragmentation level metrics monitored by a storage management device in accordance with some aspects of the disclosure.

FIG. 3 is a schematic block diagram illustrating exemplary fragmentation level metrics monitored by a storage management device 310 in accordance with some aspects of the disclosure. Referring now to FIG. 3, the schematic block diagram further illustrates how the storage management device 310 can use fragmentation level information to avoid defragmentation. In general, it should be noted that hosts run a high risk of triggering defragmentation when writing data to fragmented storage media. In a VSP, however, there can be DSDs of various capacities and of various internal storage architectures. Indeed, one of the more desirable aspects of a VSP is the flexibility to add new storage media devices, wherein such devices could be from different vendors or could have different internal storage architectures compared to media already plugged into the VSP.

In FIG. 3, for example, a storage management device 310 is coupled to a VSP formed by DSDs 320, 330, and 340, each of which have a different combination of the frequency change metric (i.e., ADF frequency) and the fragmentation level metric (i.e., ADF). For this particular example, DSD 320 has an ADF of 1 and an ADF frequency of 500 MB; DSD 330 has an ADF of 1 and an ADF frequency of 1 gigabyte (GB); and DSD 340 has an ADF of 2 and an ADF frequency of 2 GBs. Here, in an attempt to maintain an equal ADF across DSDs 320, 330, and 340, the storage management device 310 may be configured to consider the ADF along with the other criteria when determining which of DSDs 320, 330, and 340 to select for the next write operation. For instance, in addition to ADF, the storage management device 310 may be configured to consider the respective logical free space of each DSD 320, 330, and 340; the relative recycle count of each DSD 320, 330, and 340; the ADF frequency of each DSD 320, 330, and 340; and/or the size of the host data (e.g., if the host data exceeds the capacity of a particular DSD, the storage management device 310 may be configured to refrain from selecting that particular DSD as the target DSD for the next write operation).

In the example provided in FIG. 3, the storage management device 310 may thus be configured to avoid DSD 340 in a subsequent write operation to the VSP since DSD 340 has the highest current ADF. Since DSD 320 and 330 have the same ADF, however, the storage management device 310 may then be configured to select between DSD 320 and 330 based on any of the additional criteria listed above and/or criteria that is not listed. For instance, the storage management device 310 may be configured to simply rotate between DSD 320 and 330 in subsequent write operations until one of them reaches an ADF of 2. In one aspect, the storage management device 310 may be configured to select between DSD 320 and 330 based on the frequency change metric. For example, supposing the host data to be written is 500 MB, storage management device 310 may select DSD 330 for the write command to avoid causing a change in ADF at DSD 320.

Avoiding Over Cycling Individual DSDs

By keeping the ADF of each DSD in a VSP the same, as best as possible, it should be noted that the defragmentation thresholds of each DSD may be avoided until much later as well. For instance, scenarios could be avoided in which data is written to outlier DSDs that are fragmented significantly more than the other DSDs. In scenarios in which data is written to outlier DSDs, it should be noted that those outlier DSDs would undesirably run slower and reach the end of their life cycle faster. Thus, it is beneficial to avoid this where possible.

Write Amplification

Storage infrastructures often have much more capacity than is actually used (e.g., where a VSP with 3X capacity is only using 1.5× capacity). Therefore, by ensuring that DSD defragmentation thresholds are delayed longer than for DSDs in conventional VSPs, there is a higher likelihood of data getting invalidated before defragmentation, which results in an increased life span for the DSD since the amount of data internally moved by the DSD is reduced.

Figure 4:
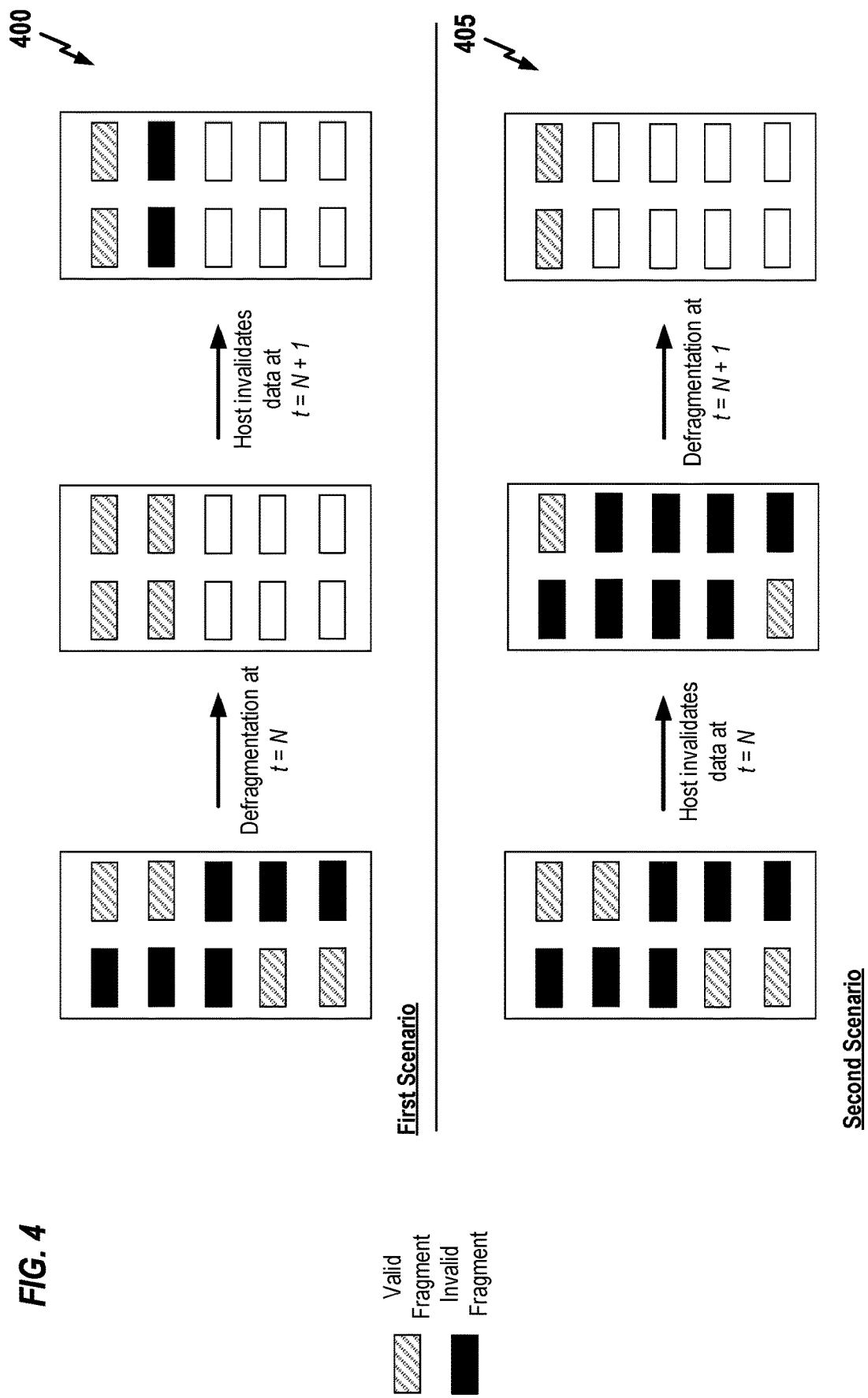
FIG. 4 is a schematic block diagram illustrating an exemplary defragmentation result facilitated by a storage management device in accordance with some aspects of the disclosure.

FIG. 4 is a schematic block diagram illustrating an exemplary defragmentation result facilitated by a storage management device in accordance with some aspects of the disclosure. As illustrated, a first scenario 400 is provided in which a host invalidates data after defragmentation, and a second scenario 405 is provided in which a host invalidates data before defragmentation. Here, it should be noted that the second scenario 405 is preferred since it results less internal data movement. Since defragmentation thresholds in the system disclosed herein are delayed longer than DSDs in conventional VSPs, the second scenario 405 is thus more likely with the system disclosed herein, relative to conventional VSPs.

Modifying Defragmentation Thresholds

It should be noted that the defragmentation threshold of a conventional DSD is typically configured without any knowledge of the system environment in which they would be used. It is contemplated, however, in one aspect, that the storage management device disclosed herein is aware of how much total VSP capacity is being utilized. In a particular embodiment, if the storage management device disclosed herein detects that utilization of VSP total capacity is consistently low, the storage management device can instruct the DSDs to increase their respective defragmentation thresholds. In other words, the storage management device may be configured to instruct a particular DSD to remain fragmented for a longer duration since the storage management device already knows that further data writes would not be performed on that DSD.

Exemplary Storage Management Device Embodiments

Figure 5:
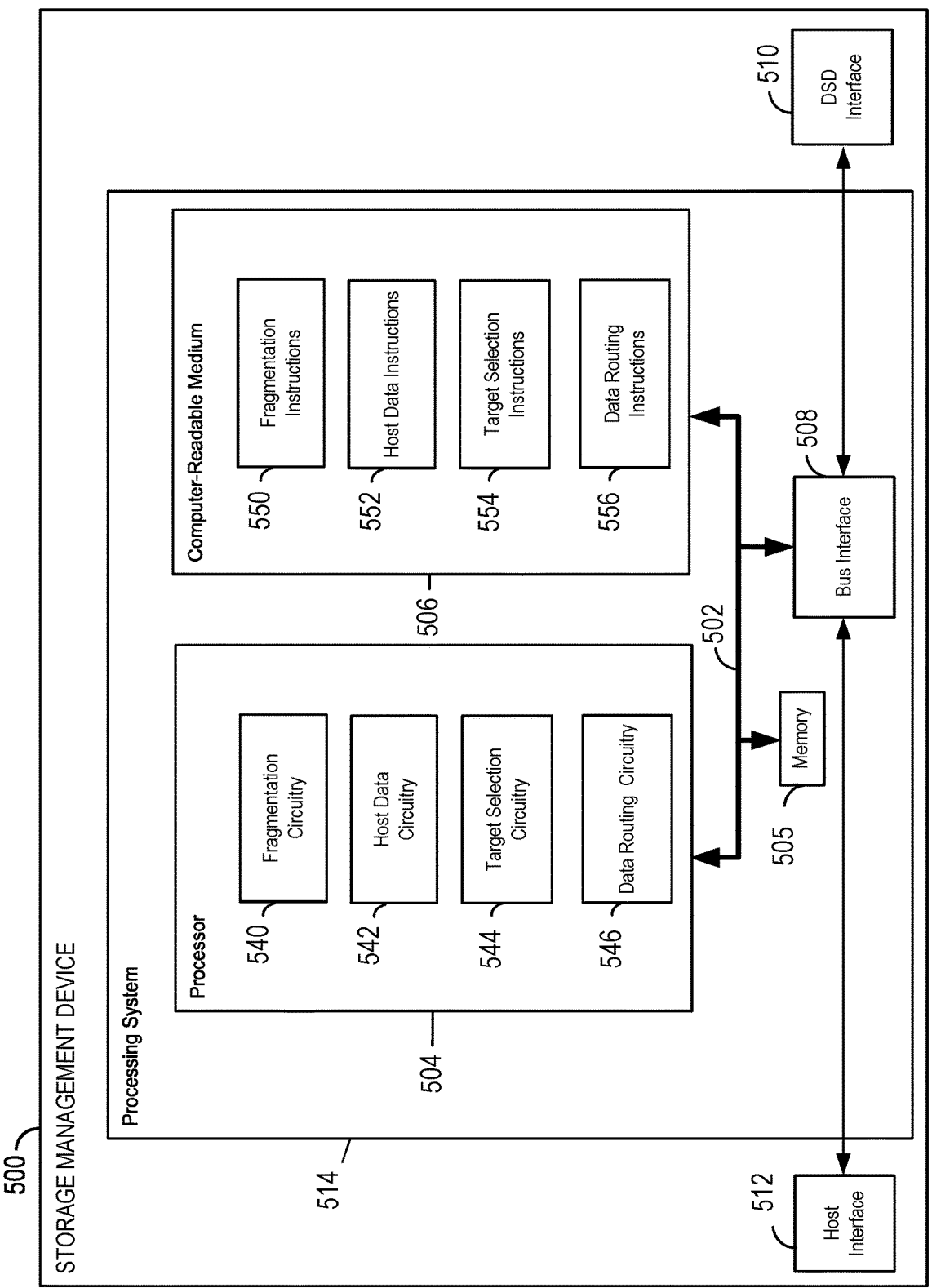
FIG. 5 is a schematic block diagram illustrating an exemplary storage management device in accordance with some aspects of the disclosure.

FIG. 5 is a block diagram illustrating an example of a hardware implementation for a storage management device 500 employing a processing system 514. For example, the storage management device 500 may be a server as illustrated in any one or more of the FIGs. disclosed herein.

The storage management device 500 may be implemented with a processing system 514 that includes one or more processors 504. Examples of processors 504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the storage management device 500 may be configured to perform any one or more of the functions described herein. That is, the processor 504, as utilized in a storage management device 500, may be used to implement any one or more of the processes and procedures described below and illustrated in the figures disclosed herein.

In this example, the processing system 514 may be implemented with a bus architecture, represented generally by the bus 502. The bus 502 may include any number of interconnecting buses and bridges depending on the specific application of the processing system 514 and the overall design constraints. The bus 502 communicatively couples together various circuits including one or more processors (represented generally by the processor 504), a memory 505, and computer-readable media (represented generally by the computer-readable medium 506). The bus 502 may also link various other circuits such as timing sources, peripherals, voltage regulators, and power management circuits, which are well known in the art, and therefore, will not be described any further. A bus interface 508 provides an interface between the bus 502 and a DSD interface 510 (e.g., a interface which emulates a host). The DSD interface 510 provides a communication interface or means for communicating over a transmission medium with various other DSDs (e.g., any of DSDs 120, 130, and/or 140 illustrated in FIG. 1). Similarly, bus interface 508 provides an interface between the bus 502 and a host interface 512, wherein host interface 512 provides a communication interface or means for communicating over a transmission medium with various other hosts (e.g., any of hosts 102 and/or 104 illustrated in FIG. 1). Either of host interface 512 or DSD interface 510 can be implemented using any of the interface technologies described below for communicating between host interface 906 and host 902 in FIG. 9.

In some aspects of the disclosure, the processor 504 may include fragmentation circuitry 540 configured for various functions, including, for example, to receive fragmentation level information from at least two of a plurality of DSDs (e.g., any of DSDs 120, 130, and/or 140 illustrated in FIG. 1). The processor 504 may further include host data circuitry 542 configured for various functions, including, for example, to receive host data from a host device (e.g., hosts 102 or 104 illustrated in FIG. 1) to be stored in one or more of the plurality of data storage devices. As illustrated, the processor 504 may also include target selection circuitry 544 configured for various functions. For instance, the target selection circuitry 544 may be configured to select, based on the fragmentation level information from the at least two of the plurality of DSDs, a target DSD from the plurality of DSDs. The processor 504 may further include data routing circuitry 546 configured for various functions, including, for example, to send the host data to the target DSD (e.g., send a host write command to the target DSD). It should also be appreciated that, the combination of the fragmentation circuitry 540, the host data circuitry 542, the target selection circuitry 544, and the data routing circuitry 546 may be configured to implement one or more of the functions described herein.

Various other aspects for storage management device 500 are also contemplated. For instance, some aspects are directed towards determining which of a plurality of DSDs to select as the target DSD. In a particular implementation, where at least two of the plurality of DSDs have different current fragmentation levels, the processor 504 may be configured to identify a subset of the plurality of DSDs having a highest current fragmentation level, wherein the processor 504 refrains from selecting a DSD included in the subset as the target DSD. In another implementation, where at least two of the plurality of DSDs again have different current fragmentation levels, the processor 504 may be configured to identify a subset of the plurality of DSDs having a lowest current fragmentation level, wherein the processor 504 selects a DSD included in the subset as the target DSD. In yet another implementation, where at least two of the plurality of DSDs have a same current fragmentation level prior to execution of a first write command and a second write command subsequent to the first write command, the processor 504 may be configured to send the first write command to the target DSD, and send the second write command to a data storage device of the plurality of data storage devices other than the target DSD.

Aspects for determining a fragmentation level metric (e.g., an ADF) for each of the at least two of the plurality of DSDs are also contemplated. For instance, the processor 504 may be configured to determine a frequency change metric (e.g., an ADF frequency) for each of the at least two of the plurality of DSDs, wherein each frequency change metric is indicative of a threshold amount of data that can be respectively written to each of the at least two of the plurality of DSDs before an expected increase in a corresponding fragmentation level metric. The processor 504 may then be further configured to determine a timing to request the fragmentation level metric from each of the at least two of the plurality of DSDs based on the respective frequency change metric. Within such embodiment, the processor 504 may also be configured to monitor an amount of data that has been respectively written onto each of the at least two of the plurality of DSDs since a most recent fragmentation level metric request for the respective DSDs. A subsequent fragmentation level metric request may then be sent to each of the at least two of the plurality of DSDs, wherein each subsequent request is in accordance with the timing to request the fragmentation level metric and based on the monitored amount of data for the respective DSD.

Aspects directed towards modifying defragmentation thresholds in DSDs are also disclosed. In an exemplary embodiment, the processor 504 may be configured to determine a defragmentation threshold associated with at least one of the at least two of the plurality of DSDs configured to perform a defragmentation process responsive to a defragmentation level exceeding the defragmentation threshold, wherein the processor 504 is then further configured to modify the defragmentation threshold associated with the at least one of the at least two of the plurality of DSDs. In a particular aspect of such embodiment, the processor 504 may also be configured to modify the defragmentation threshold associated with the at least one of the at least two of the plurality of DSDs based on a combined storage capacity of the plurality of DSDs. In another aspect of such embodiment, the processor 504 may be configured to modify the defragmentation threshold associated with the at least one of the at least two of the plurality of DSDs based on a historical utilization of the at least one of the plurality of DSDs.

Referring back to the remaining components of storage management device 500, it should be appreciated that the processor 504 is responsible for managing the bus 502 and general processing, including the execution of software stored on the computer-readable medium 506. The software, when executed by the processor 504, causes the processing system 514 to perform the various functions described below for any particular apparatus. The computer-readable medium 506 and the memory 505 may also be used for storing data that is manipulated by the processor 504 when executing software.

One or more processors 504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 506. The computer-readable medium 506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 506 may reside in the processing system 514, external to the processing system 514, or distributed across multiple entities including the processing system 514. The computer-readable medium 506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 506 may include fragmentation instructions 550 configured for various functions, including, for example, to receive fragmentation level information from at least two of a plurality of data storage devices (e.g., any of DSDs 120, 130, and/or 140 illustrated in FIG. 1). The computer-readable storage medium 506 may further include host data instructions 552 configured for various functions, including, for example, to receive host data from a host device (e.g., hosts 102 or 104 illustrated in FIG. 1) to be stored in one or more of the plurality of data storage devices. As illustrated, the computer-readable storage medium 506 may also include target selection instructions 554 configured for various functions. For instance, the target selection instructions 554 may be configured to select, based on the fragmentation level information from the at least two of the plurality of data storage devices, a target data storage device from the plurality of data storage devices. The computer-readable storage medium 506 may further include data routing instructions 556 configured for various functions, including, for example, to send the host data to the target data storage device.

Figure 6:
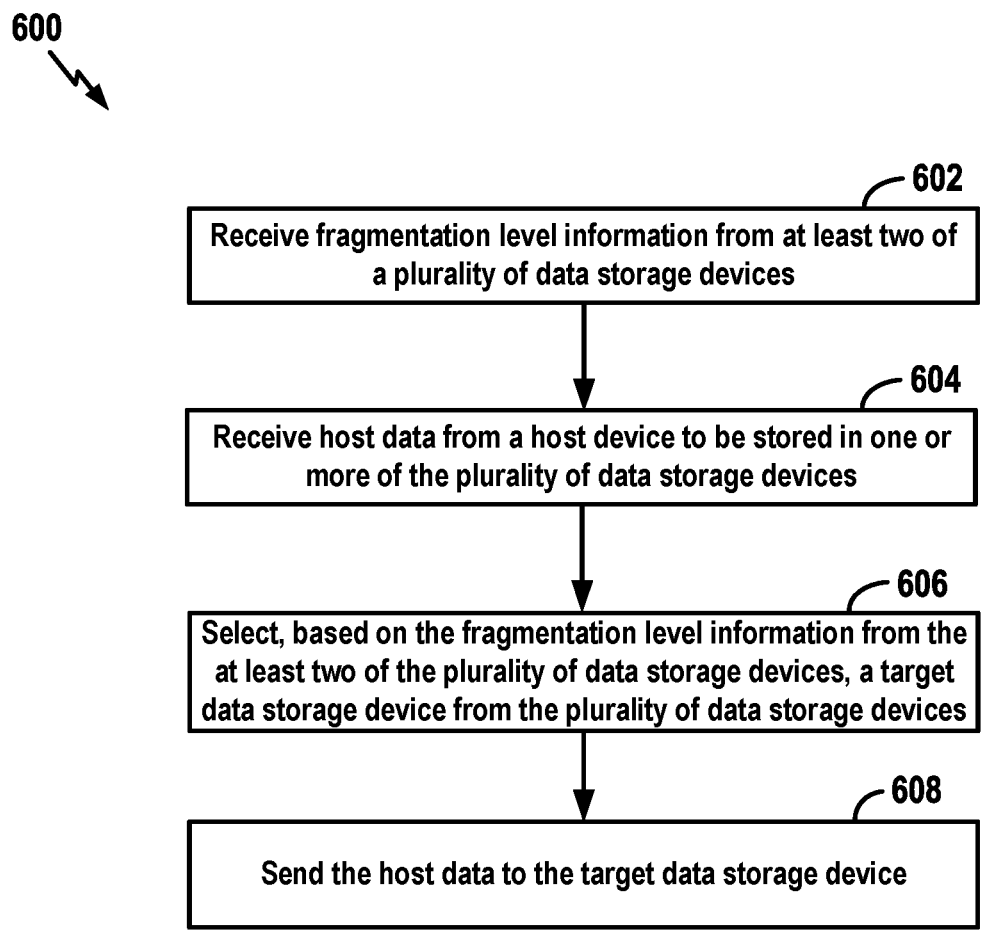
FIG. 6 is a flowchart illustrating a method for managing a DSD pool that may be performed by a storage management device in accordance with some aspects of the disclosure.

FIG. 6 is a flowchart illustrating a method/process 600 for managing a DSD pool that may be performed by a storage management device in accordance with some aspects of the disclosure. In one aspect, the method/process 600 may be performed by processor 504. The DSDs described for process 600 can be any of DSDs 120, 130, and/or 140 illustrated in FIG. 1; DSD 220 illustrated in FIG. 2; any of DSDs 320, 330, and/or 340 illustrated in FIG. 3; DSD 904 illustrated in FIG. 9; DSD 1100 illustrated in FIG. 11; or the combination of apparatus 1200 and NVM 1201 illustrated in FIG. 12.

At block 602, the process 600 receives fragmentation level information from at least two of a plurality of DSDs, and at block 604, the process 600 receives host data from a host device (e.g., hosts 102 or 104 illustrated in FIG. 1) to be stored in one or more of the plurality of data storage devices. The process 600 then proceeds to block 606 where, based on the fragmentation level information received from the at least two of the plurality of DSDs, a target DSD is selected from the plurality of DSDs. At block 608, the process 600 concludes with the host data sent to the target DSD.

Various other aspects for process 600 are also contemplated. For instance, some aspects are directed towards determining which of a plurality of DSDs to select as the target DSD. In a particular implementation, where at least two of the plurality of DSDs have different current fragmentation levels, process 600 may include additional blocks directed towards identifying a subset of the plurality of DSDs having a highest current fragmentation level, wherein the process 600 refrains from selecting a DSD included in the subset as the target DSD. In another implementation, where at least two of the plurality of DSDs again have different current fragmentation levels, the process 600 may include additional blocks directed towards identifying a subset of the plurality of DSDs having a lowest current fragmentation level, wherein the process 600 selects a DSD included in the subset as the target DSD. In yet another implementation, where at least two of the plurality of DSDs have a same current fragmentation level prior to execution of a first write command and a second write command subsequent to the first write command, the process 600 may include additional blocks directed towards sending the first write command to the target DSD, and sending the second write command to a data storage device of the plurality of data storage devices other than the target DSD.

Aspects for determining a fragmentation level metric (e.g., an ADF) for each of the at least two of the plurality of DSDs are also contemplated. For instance, the process 600 may include additional blocks directed towards determining a frequency change metric (e.g., an ADF frequency) for each of the at least two of the plurality of DSDs, wherein each frequency change metric is indicative of a threshold amount of data that can be respectively written to each of the at least two of the plurality of DSDs before an expected increase in a corresponding fragmentation level metric. The process 600 may then further include blocks directed towards determining a timing to request the fragmentation level metric from each of the at least two of the plurality of DSDs based on the respective frequency change metric. Within such embodiment, the process 600 may include additional blocks directed towards monitoring an amount of data that has been respectively written onto each of the at least two of the plurality of DSDs since a most recent fragmentation level metric request for the respective DSDs. The process 600 may then include blocks directed towards sending a subsequent fragmentation level metric request to each of the at least two of the plurality of DSDs, wherein each subsequent request is in accordance with the timing to request the fragmentation level metric and based on the monitored amount of data for the respective DSD.

Aspects directed towards modifying defragmentation thresholds in DSDs are also disclosed. In an exemplary embodiment, the process 600 may include additional blocks directed towards determining a defragmentation threshold associated with at least one of the at least two of the plurality of DSDs configured to perform a defragmentation process responsive to a defragmentation level exceeding the defragmentation threshold, wherein the process 600 may then further include blocks directed towards modifying the defragmentation threshold associated with the at least one of the at least two of the plurality of DSDs. In a particular aspect of such embodiment, the process 600 may also include blocks directed towards modifying the defragmentation threshold associated with the at least one of the at least two of the plurality of DSDs based on a combined storage capacity of the plurality of DSDs. In another aspect of such embodiment, the process 600 includes blocks directed towards modifying the defragmentation threshold associated with the at least one of the at least two of the plurality of DSDs based on a historical utilization of the at least one of the plurality of DSDs.

Figure 7:
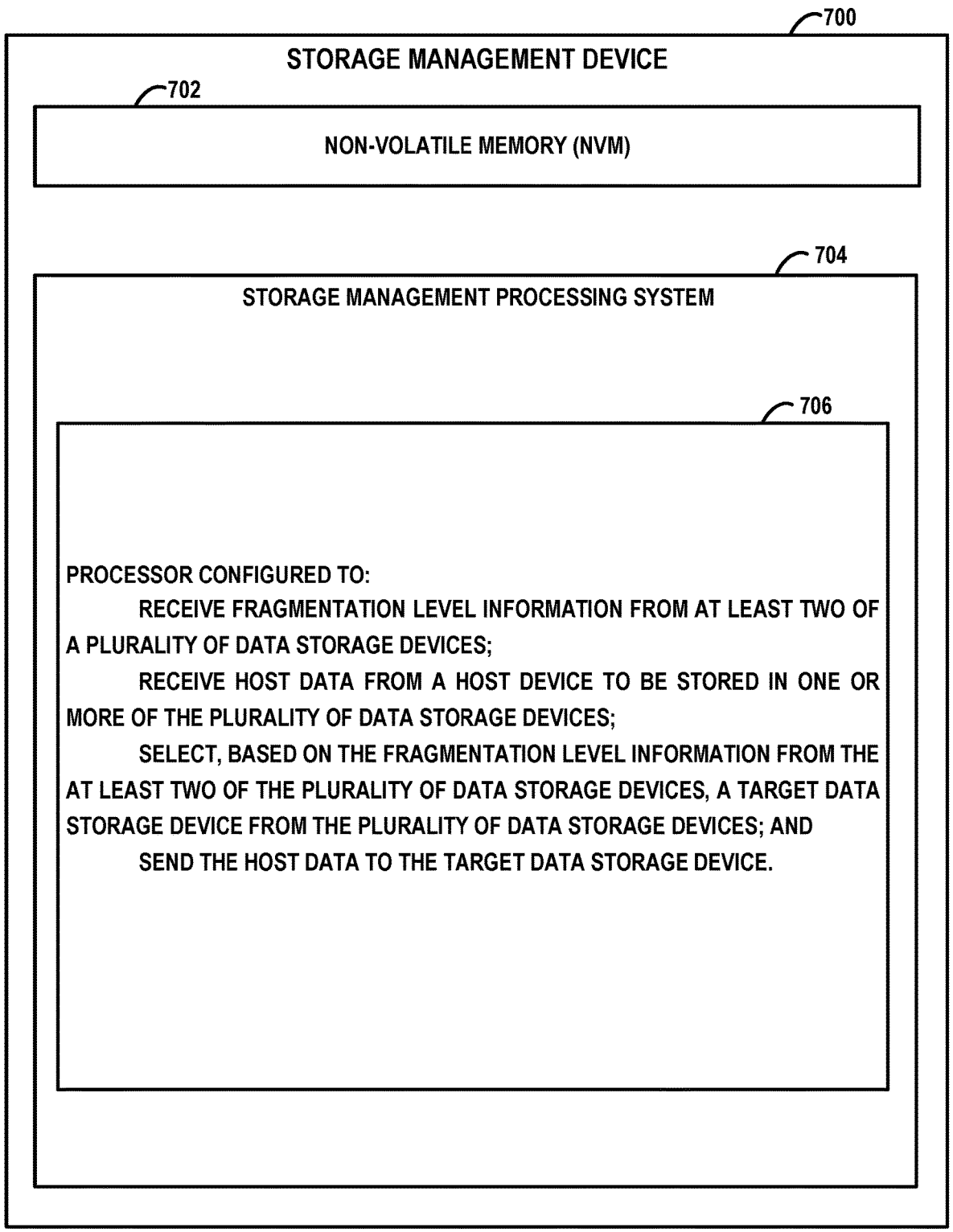
FIG. 7 is a schematic block diagram illustrating an exemplary storage management device configured to manage a DSD pool in accordance with some aspects of the disclosure.

FIG. 7 is a schematic block diagram illustrating an exemplary storage management device 700 configured to manage a DSD pool in accordance with some aspects of the disclosure. The storage management device 700 includes a non-volatile memory (NVM) 702 and a storage management processing system 704. The storage management processing system 704 includes a processor or processing circuit 706 configured to: receive fragmentation level information from at least two of a plurality of DSDs; receive host data from a host device to be stored in one or more of the plurality of data storage devices; select, based on the fragmentation level information from the at least two of the plurality of DSDs, a target DSD from the plurality of DSDs; and send the host data to the target DSD.

In a particular implementation, where at least two of the plurality of DSDs have different current fragmentation levels, the processor 706 may be configured to identify a subset of the plurality of DSDs having a highest current fragmentation level, wherein the processor 706 refrains from selecting a DSD included in the subset as the target DSD. Alternatively, where at least two of the plurality of DSDs again have different current fragmentation levels, the processor 706 may be configured to identify a subset of the plurality of DSDs having a lowest current fragmentation level, wherein the processor 706 selects a DSD included in the subset as the target DSD. In another implementation, where at least two of the plurality of DSDs have a same current fragmentation level prior to execution of a first write command and a second write command subsequent to the first write command, the processor 706 may be configured to send the first write command to the target DSD, and send the second write command to a data storage device of the plurality of data storage devices other than the target DSD.

The processor 706 may also be configured to determine a frequency change metric (e.g., an ADF frequency) for each of the at least two of the plurality of DSDs, wherein each frequency change metric is indicative of a threshold amount of data that can be respectively written to each of the at least two of the plurality of DSDs before an expected increase in a corresponding fragmentation level metric. The processor 706 may then be further configured to determine a timing to request the fragmentation level metric from each of the at least two of the plurality of DSDs based on the respective frequency change metric. Within such embodiment, the processor 706 may also be configured to monitor an amount of data that has been respectively written onto each of the at least two of the plurality of DSDs since a most recent fragmentation level metric request for the respective DSDs. A subsequent fragmentation level metric request may then be sent to each of the at least two of the plurality of DSDs, wherein each subsequent request is in accordance with the timing to request the fragmentation level metric and based on the monitored amount of data for the respective DSD.

The processor 706 may also be configured to determine a defragmentation threshold associated with at least one of the at least two of the plurality of DSDs configured to perform a defragmentation process responsive to a defragmentation level exceeding the defragmentation threshold, wherein the processor 706 is then further configured to modify the defragmentation threshold associated with the at least one of the at least two of the plurality of DSDs. In a particular aspect of such embodiment, the processor 706 may also be configured to modify the defragmentation threshold associated with the at least one of the at least two of the plurality of DSDs based on a combined storage capacity of the plurality of DSDs. In another aspect of such embodiment, the processor 706 may be configured to modify the defragmentation threshold associated with the at least one of the at least two of the plurality of DSDs based on a historical utilization of the at least one of the plurality of DSDs.

Figure 8:
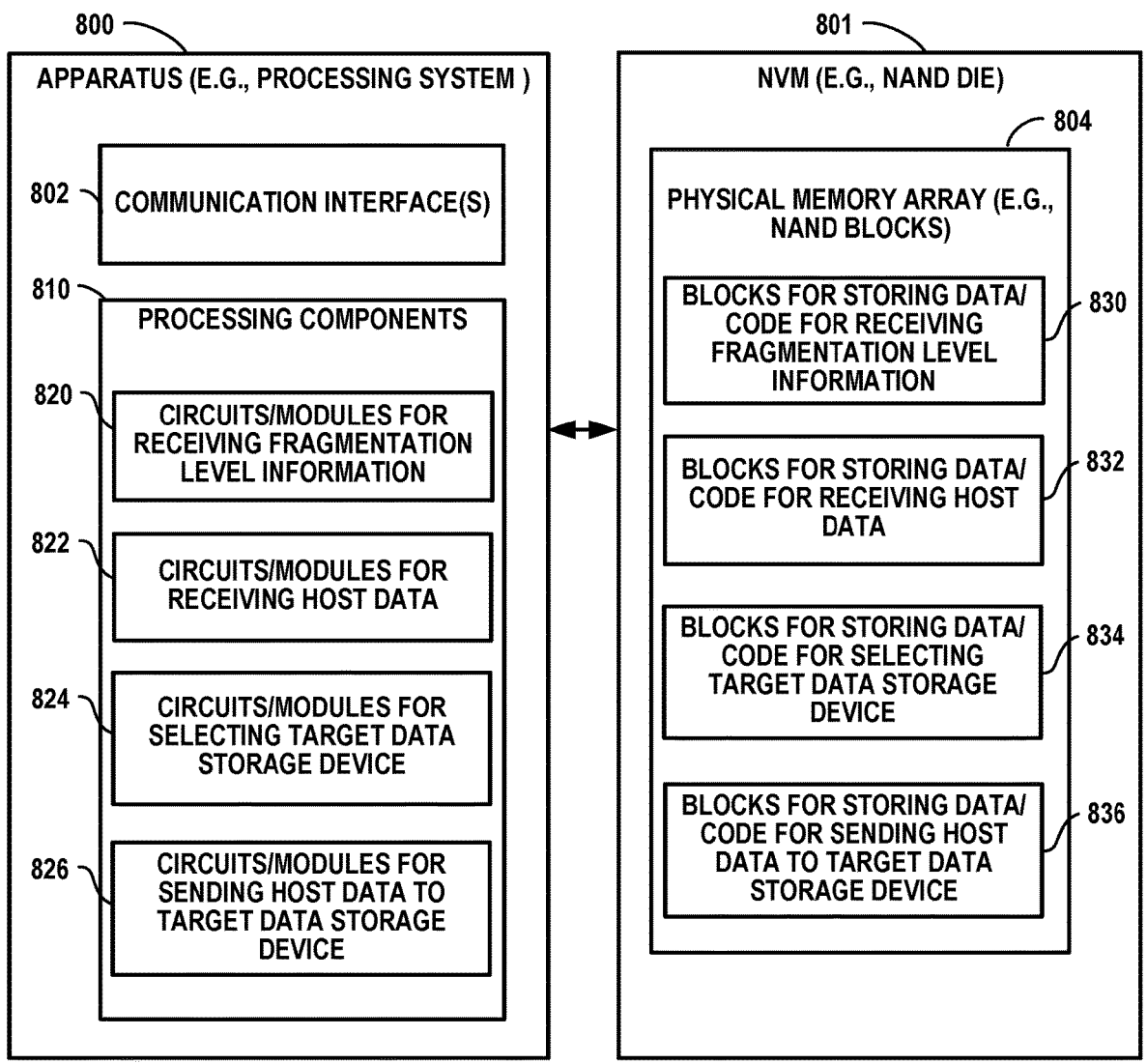
FIG. 8 is a schematic block diagram configuration for an exemplary storage management device configured to manage a DSD pool in accordance with some aspects of the disclosure.

FIG. 8 is a schematic block diagram configuration for an exemplary storage management device 800 configured to manage a DSD pool in accordance with some aspects of the disclosure. The apparatus 800, or components thereof, could embody or be implemented within a processing system (e.g., processing system 514 illustrated in FIG. 5) such as a processing system coupled to a volatile memory (not shown) and a NAND die or some other type of NVM array that supports data storage. In various implementations, the apparatus 800, or components thereof, could be a component of a processor, a controller, a computing device, a personal computer, a portable device, workstation, a server, a personal digital assistant, a digital camera, a digital phone, an entertainment device, a medical device, a self-driving vehicle control device, an edge device, or any other electronic device that stores, processes, or uses data.

The apparatus 800 includes a communication interface 802 and is coupled to a NVM 801 (e.g., a NAND die). The NVM 801 includes physical memory array 804. These components can be coupled to and/or placed in electrical communication with one another via suitable components, represented generally by the connection line in FIG. 8. Although not shown, other circuits such as timing sources, peripherals, voltage regulators, and power management circuits may be provided, which will not be described any further. Additional components, such as those shown in FIG. 5, may also be included with apparatus 800.

The communication interface 802 of the apparatus 800 provides a means for communicating with other apparatuses over a transmission medium. In some implementations, the communication interface 802 includes circuitry and/or programming (e.g., a program) adapted to facilitate the communication of information bi-directionally with respect to one or more devices in a system. In some implementations, the communication interface 802 may be configured for wire-based communication. For example, the communication interface 802 could be a bus interface, a send/receive interface, or some other type of signal interface including circuitry for outputting and/or obtaining signals (e.g., outputting signal from and/or receiving signals into a storage management device).

The physical memory array 804 may include one or more NAND blocks (830, 832, 834, 836) or other suitable NVM blocks. The physical memory array 804 may be accessed by the processing components 810.

In one aspect, the apparatus 800 may also include volatile memory for storing instructions and other information to support the operation of the processing components 810.

The apparatus 800 includes various processing components 810 arranged or configured to obtain, process and/or send data, control data access and storage, issue or respond to commands, and control other desired operations. For example, the components 810 may be implemented as one or more processors, one or more controllers, and/or other structures configured to perform functions. According to one or more aspects of the disclosure, the components 810 may be adapted to perform any or all of the features, processes, functions, operations and/or routines described herein. For example, the components 810 may be configured to perform any of the steps, functions, and/or processes described with respect to the FIGS. included herein. As used herein, the term "adapted" in relation to components 810 may refer to the components being one or more of configured, employed, implemented, and/or programmed to perform a particular process, function, operation and/or routine according to various features described herein. The circuits may include a specialized processor, such as an ASIC that serves as a means for (e.g., structure for) carrying out any one of the operations described, e.g., in conjunction with the FIGS. included herein. The components 810 serve as an example of a means for processing. In various implementations, the components 810 may provide and/or incorporate, at least in part, functionality described above for the components of processing system 514 of FIG. 5 or storage management processing system of FIG. 7.

According to at least one example of the apparatus 800, the processing components 810 may include one or more of: circuit/modules 820 configured for receiving fragmentation level information; circuits/modules 822 configured for receiving host data; circuits/modules 824 configured for selecting a target DSD; and circuits/modules 826 configured for sending the host data to a target DSD.

The physical memory array 804 may include one or more of: blocks 830 configured to store data/code for receiving fragmentation level information; blocks 832 configured to store data/code for receiving host data; blocks 834 configured to store data/code for selecting a target DSD; and blocks 836 configured to store data/code for sending the host data to a target DSD.

In at least some examples, means may be provided for performing the functions illustrated in FIG. 7 and/or other functions illustrated or described herein. For example, the means may include one or more of: means, such as circuit/module 820, for receiving fragmentation level information from at least two of a plurality of DSDs; means, such as circuit/module 822, for receiving host data from a host device to be stored in one or more of the plurality of data storage devices; means, such as circuit/module 824, for selecting, based on the fragmentation level information from the at least two of the plurality of DSDs, a target DSD from the plurality of DSDs; and means, such as circuit/module 826, for sending the host data to the target DSD.

In the examples of the figures included herein, NAND memory is sometimes set forth as an exemplary NVM. In one aspect, the NVM may be flash memory or another suitable NVM, examples of which are noted above at the beginning of the Detailed Description section.

Exemplary Data Storage Device Embodiments

Figure 9:
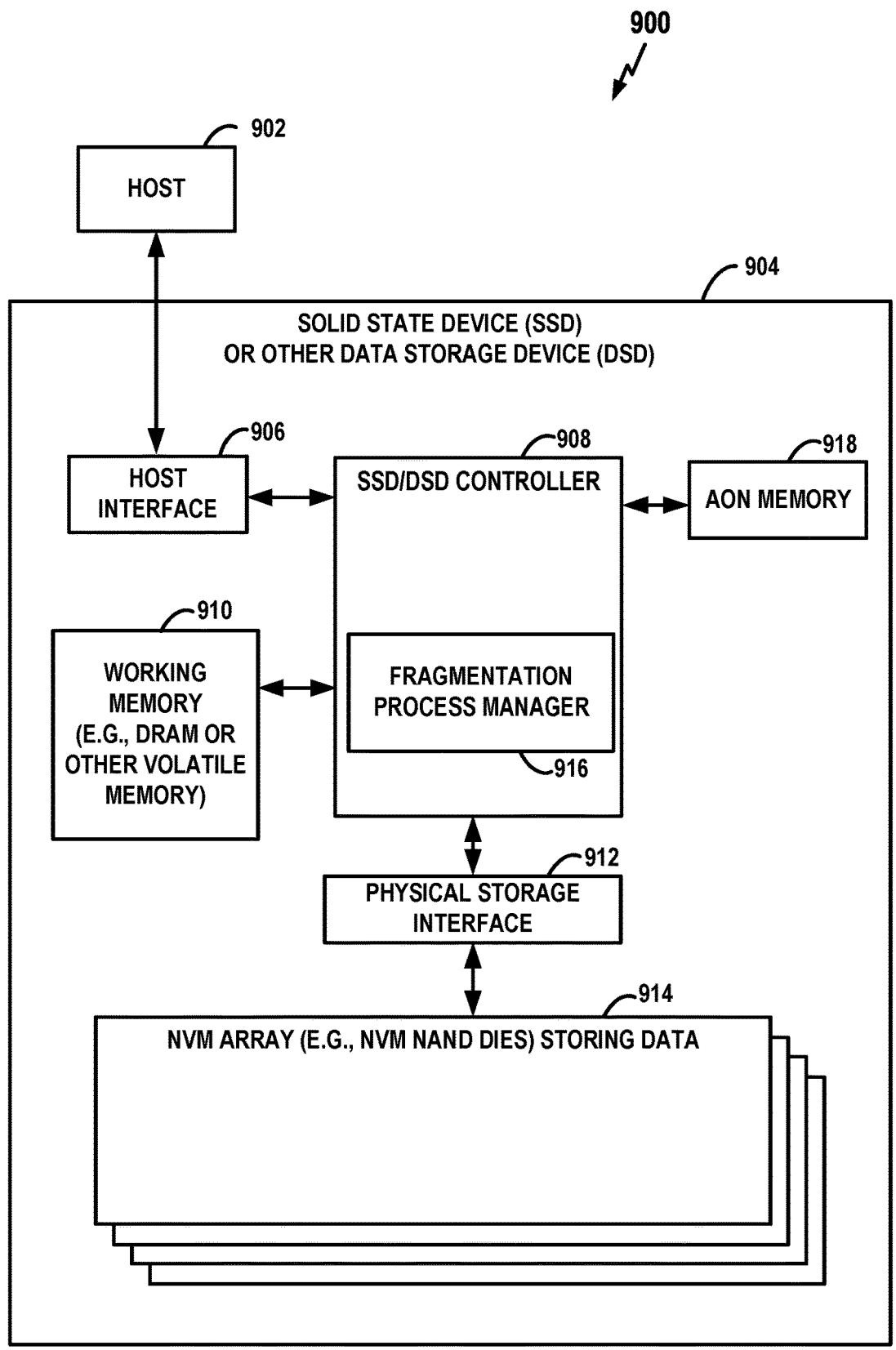
FIG. 9 is a schematic block diagram illustrating an exemplary DSD embodied as a solid-state device (SSD) including an SSD controller configured to manage a defragmentation process in accordance with some aspects of the disclosure.

FIG. 9 is a schematic block diagram illustrating an exemplary DSD embodied as an SSD, including an SSD controller configured to manage a defragmentation process in accordance with some aspects of the disclosure. The system 900 includes a host 902 and the SSD 904 (or other DSD, but for simplicity referred to as an SSD below) coupled to the host 902. The host 902 provides commands to the SSD 904 for transferring data between the host 902 and the SSD 904. For example, the host 902 may provide a write command to the SSD 904 for writing data to the SSD 904 or read command to the SSD 904 for reading data from the SSD 904. The host 902 may be any system or device having a need for data storage or retrieval and a compatible interface for communicating with the SSD 904. For example, the host 902 may be a computing device, a personal computer, a portable computer, a workstation, a server, a personal digital assistant, a digital camera, or a digital phone as merely a few examples.

The SSD 904 includes a host interface 906, an SSD or DSD controller 908, a working memory 910 (such as dynamic random access memory (DRAM) or other volatile memory), a physical storage (PS) interface 912 (e.g., flash interface module (FIM)), and an NVM array 914 having one or more dies storing data. The host interface 906 is coupled to the controller 908 and facilitates communication between the host 902 and the controller 908. The controller 908 is coupled to the working memory 910 as well as to the NVM array 914 via the PS interface 912. The host interface 906 may be any suitable communication interface, such as a Non-Volatile Memory express (NVMe) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an Institute of Electrical and Electronics Engineers (IEEE) 1394 (Firewire) interface, Secure Digital (SD), or the like. In some embodiments, the host 902 includes the SSD 904. In other embodiments, the SSD 904 is remote from the host 902 or is contained in a remote computing system communicatively coupled with the host 902. For example, the host 902 may communicate with the SSD 904 through a wireless communication link. The NVM array 914 may include multiple dies.

In some examples, the host 902 may be a laptop computer with an internal SSD and a user of the laptop may wish to playback video stored by the SSD. In another example, the host again may be a laptop computer, but the video is stored by a remote server.

Although, in the example illustrated in FIG. 9, SSD 904 includes a single channel between controller 908 and NVM array 914 via PS interface 912, the subject matter described herein is not limited to having a single memory channel. For example, in some NAND memory system architectures, two, four, eight or more NAND channels couple the controller and the NAND memory device, depending on controller capabilities. In any of the embodiments described herein, more than a single channel may be used between the controller and the memory die, even if a single channel is shown in the drawings. The controller 908 may be implemented in a single integrated circuit chip and may communicate with different layers of memory in the NVM 914 over one or more command channels.

The controller 908 controls operation of the SSD 904. In various aspects, the controller 908 receives commands from the host 902 through the host interface 906 and performs the commands to transfer data between the host 902 and the NVM array 914. Furthermore, the controller 908 may manage reading from and writing to working memory 910 for performing the various functions effected by the controller and to maintain and manage cached information stored in the working memory 910.

The controller 908 may include any type of processing device, such as a microprocessor, a microcontroller, an embedded controller, a logic circuit, software, firmware, or the like, for controlling operation of the SSD 904. In some aspects, some or all of the functions described herein as being performed by the controller 908 may instead be performed by another element of the SSD 904. For example, the SSD 904 may include a microprocessor, a microcontroller, an embedded controller, a logic circuit, software, firmware, application specific integrated circuit (ASIC), or any kind of processing device, for performing one or more of the functions described herein as being performed by the controller 908. According to other aspects, one or more of the functions described herein as being performed by the controller 908 are instead performed by the host 902. In still further aspects, some or all of the functions described herein as being performed by the controller 908 may instead be performed by another element such as a controller in a hybrid drive including both non-volatile memory elements and magnetic storage elements. The SSD controller 908 includes a fragmentation process manager 916, which can be configured to perform defragmentation process management as will be described in further detail below. In one aspect, the fragmentation process manager 916 can store SSD status information in an always ON (AON) memory 918 or other suitable memory such as the NVM array 914.

The SSD controller 908 includes a fragmentation process manager 916, which can be configured to perform fragmentation process management as will be described in further detail below. In one aspect, the fragmentation process manager 916 is a module within the SSD controller 908 that is controlled by firmware. In one aspect, the fragmentation process manager 916 may be a separate component from the SSD controller 908 and may be implemented using any combination of hardware, software, and firmware (e.g., like the implementation options described above for SSD controller 908) that can perform defragmentation process management as will be described in further detail below. In one example, the fragmentation process manager 916 is implemented using a firmware algorithm or other set of instructions that can be performed on the SSD controller 908 to implement the defragmentation process management functions described below.

The working memory 910 may be any suitable memory, computing device, or system capable of storing data. For example, working memory 910 may be ordinary RAM, DRAM, double data rate (DDR) RAM, static RAM (SRAM), synchronous dynamic RAM (SDRAM), a flash storage, an erasable programmable read-only-memory (EPROM), an electrically erasable programmable ROM (EEPROM), or the like. In various embodiments, the controller 908 uses the working memory 910, or a portion thereof, to store data during the transfer of data between the host 902 and the NVM array 914. For example, the working memory 910 or a portion of the volatile memory 910 may be used as a cache memory. The NVM array 914 receives data from the controller 908 via the PS interface 912 and stores the data. In some embodiments, working memory 910 may be replaced by a non-volatile memory such as MRAM, PCM, ReRAM, etc. to serve as a working memory for the overall device.

The NVM array 914 may be implemented using flash memory (e.g., NAND flash memory). In one aspect, the NVM array 914 may be implemented using any combination of NAND flash, PCM arrays, MRAM arrays, and/or ReRAM.

The PS interface 912 provides an interface to the NVM array 914. For example, in the case where the NVM array 914 is implemented using NAND flash memory, the PS interface 912 may be a flash interface module. In one aspect, the PS interface 912 may be implemented as a component of the SSD controller 908.

In the example of FIG. 9, the controller 908 may include hardware, firmware, software, or any combinations thereof that provide the functionality for the fragmentation process manager 916.

Although FIG. 9 shows an exemplary SSD and an SSD is generally used as an illustrative example in the description throughout, the various disclosed embodiments are not necessarily limited to an SSD application/implementation. As an example, the disclosed NVM array and associated processing components can be implemented as part of a package that includes other processing circuitry and/or components. For example, a processor may include, or otherwise be coupled with, embedded NVM array and associated circuitry. The processor could, as one example, off-load certain operations to the NVM and associated circuitry and/or components. As another example, the SSD controller 908 may be a controller in another type of device and still be configured to perform/control defragmentation process management, and perform/control some or all of the other functions described herein.

The AON memory 918 may be any suitable memory, computing device, or system capable of storing data with a connection to power that does not get switched off. For example, AON memory 918 may be ordinary RAM, DRAM, double data rate (DDR) RAM, static RAM (SRAM), synchronous dynamic RAM (SDRAM), a flash storage, an erasable programmable read-only-memory (EPROM), an electrically erasable programmable ROM (EEPROM), or the like with a continuous power supply. In one aspect, the AON memory 918 may be a RAM with a continuous power supply (e.g., a connection to power that cannot be switched off unless there is a total loss of power to the SSD, such as during a graceful or ungraceful shutdown). In some aspects, the AON memory 918 is an optional component. Thus, in at least some aspects, the SSD 904 does not include the AON memory 918.

Figure 10:
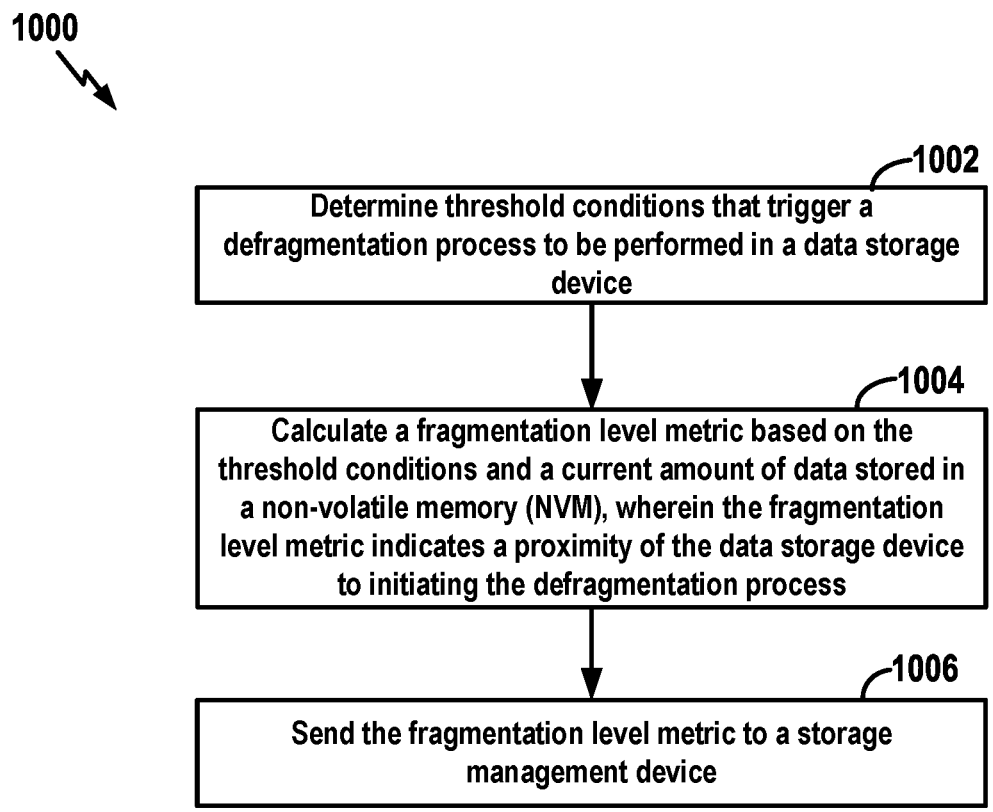
FIG. 10 is a flowchart illustrating a method for managing a defragmentation process that may be performed by a controller of a DSD in accordance with some aspects of the disclosure.

FIG. 10 is a flowchart illustrating a method/process 1000 for managing a defragmentation process that may be performed by a controller of an SSD in accordance with some aspects of the disclosure. In one aspect, the process 1000 may be performed by the SSD/DSD controller 908 (or fragmentation process manager 916) of FIG. 9, the DSD controller 1104 of FIG. 11, the DSD controller 1200 of FIG. 12, or any other suitably equipped device controller. The NVM described for process 1000 can be the working NVM of the SSD such as NVM arrays 914 of FIG. 9, NVM 1102 of FIG. 11, or NVM 1201 of FIG. 12.

At block 1002, the process 1000 determines threshold conditions that trigger a defragmentation process to be performed in a DSD. The process 1000 then proceeds to block 1004 where, a fragmentation level metric (e.g., an ADF) is calculated based on the threshold conditions and a current amount of data stored in an NVM, wherein the fragmentation level metric indicates a proximity of the DSD to initiating the defragmentation process. At block 1006, the process 1000 concludes with the fragmentation level metric sent to a storage management device (e.g., storage management device 110 illustrated in FIG. 1, storage management device 210 illustrated in FIG. 2, storage management device 310 illustrated in FIG. 3, storage management device 500 illustrated in FIG. 5, storage management device 700 illustrated in FIG. 7, or the combination of apparatus 800 and NVM 801 illustrated in FIG. 8).

Various other aspects for process 1000 are also contemplated. For instance, in a particular embodiment, process 1000 may include additional blocks directed towards calculating a frequency change metric (e.g., an ADF frequency), which is indicative of a threshold amount of data that can be written to the DSD before an expected increase in the fragmentation level metric. Within such embodiment, the process 1000 may then further include blocks directed towards sending the frequency change metric to the storage management device.

In another embodiment, the process 1000 may include additional blocks directed towards enabling the storage management device to modify the threshold conditions that trigger the defragmentation process.

In yet another embodiment, the process 1000 may include additional blocks directed towards detecting a change in the fragmentation level metric, and reporting, responsive to detecting the change in the fragmentation level metric, the change in the fragmentation level metric to the storage management device.

Figure 11:
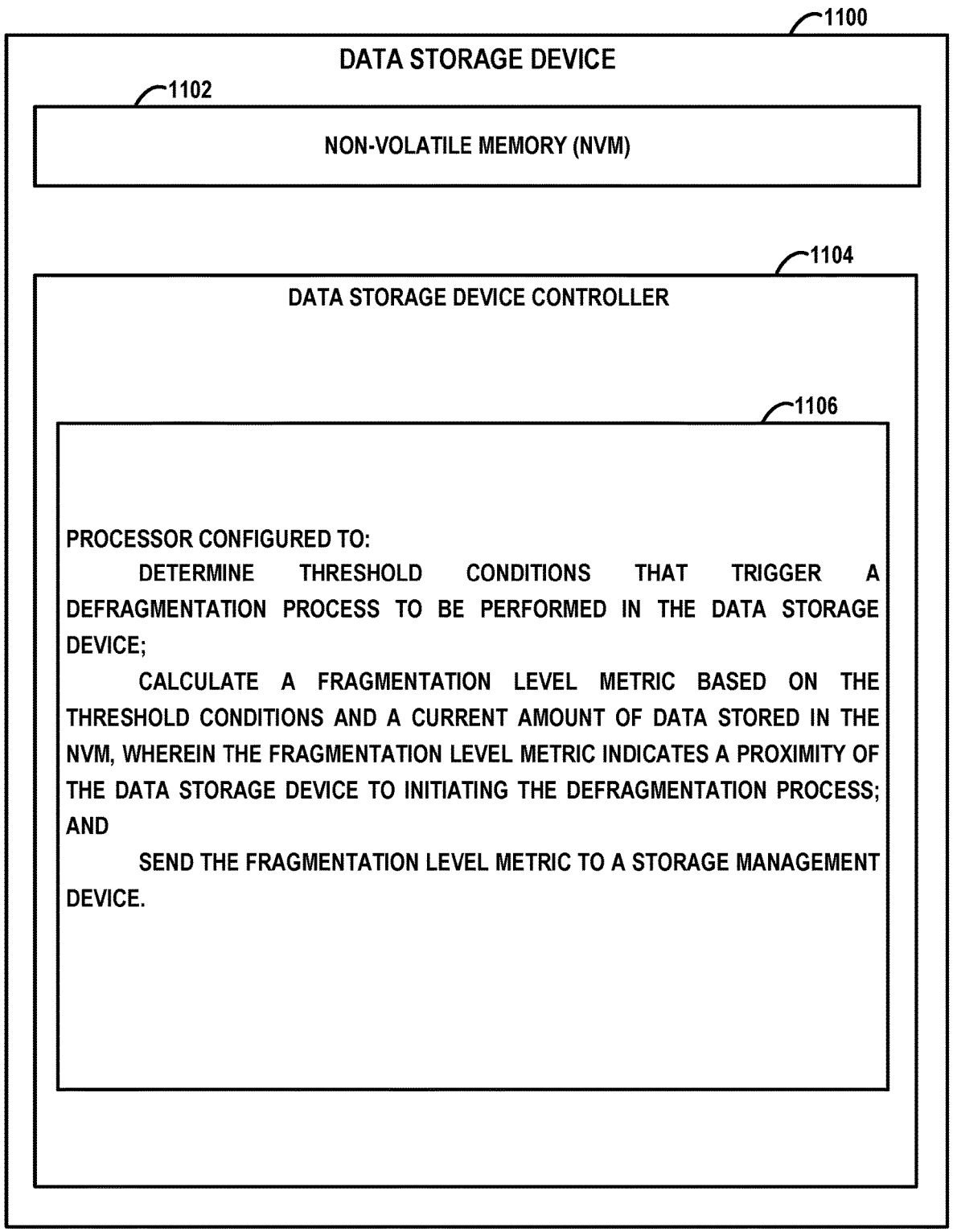
FIG. 11 is a schematic block diagram illustrating an exemplary DSD configured to perform defragmentation process management in accordance with some aspects of the disclosure.

FIG. 11 is a schematic block diagram illustrating an exemplary DSD 1100 configured to perform defragmentation process management in accordance with some aspects of the disclosure. The DSD 1100 includes an NVM 1102 and a DSD controller 1104. The DSD controller 1104 includes a processor or processing circuit 1106 configured to: determine threshold conditions that trigger a defragmentation process to be performed in the DSD 1100; calculate a fragmentation level metric based on the threshold conditions and a current amount of data stored in the NVM 1102, wherein the fragmentation level metric indicates a proximity of the DSD 1100 to initiating the defragmentation process; and send the fragmentation level metric to a storage management device (e.g., storage management device 110 illustrated in FIG. 1, storage management device 210 illustrated in FIG. 2, storage management device 310 illustrated in FIG. 3, storage management device 500 illustrated in FIG. 5, storage management device 700 illustrated in FIG. 7, or the combination of apparatus 800 and NVM 801 illustrated in FIG. 8).

Various other aspects for DSD 1100 are also contemplated. For instance, in a particular embodiment, the processor 1106 may also be configured to calculate a frequency change metric (e.g., an ADF frequency), which is indicative of a threshold amount of data that can be written to the DSD 1100 before an expected increase in the fragmentation level metric. Within such embodiment, the processor 1106 may then be further configured to send the frequency change metric to the storage management device.

In another embodiment, the processor 1106 is configured to enable the storage management device to modify the threshold conditions that trigger the defragmentation process.

In yet another embodiment, the processor 1106 may be configured to detect a change in the fragmentation level metric, and further configured to report, responsive to detecting the change in the fragmentation level metric, the change in the fragmentation level metric to the storage management device.

Figure 12:
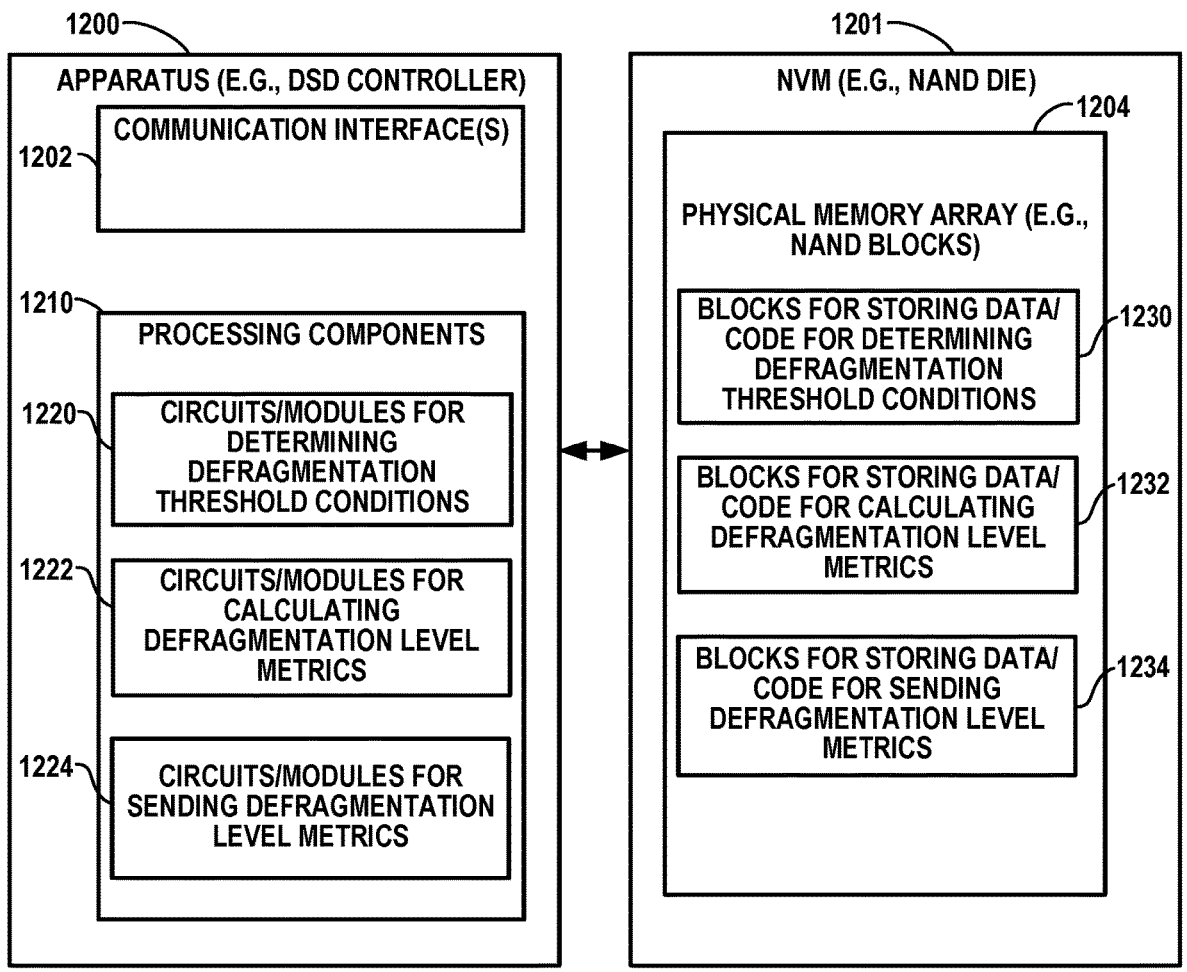
FIG. 12 is a schematic block diagram configuration for an exemplary DSD configured to perform defragmentation process management in accordance with some aspects of the disclosure.

FIG. 12 is a schematic block diagram configuration for an exemplary DSD 1200 configured to perform defragmentation process management in accordance with some aspects of the disclosure. The apparatus 1200, or components thereof, could embody or be implemented within a data storage controller such as a DSD controller coupled to a volatile memory (not shown) and a NAND die or some other type of NVM array that supports data storage. In various implementations, the apparatus 1200, or components thereof, could be a component of a processor, a controller, a computing device, a personal computer, a portable device, workstation, a server, a personal digital assistant, a digital camera, a digital phone, an entertainment device, a medical device, a self-driving vehicle control device, an edge device, or any other electronic device that stores, processes, or uses data.

The apparatus 1200 includes a communication interface 1202 and is coupled to a NVM 1201 (e.g., a NAND die). The NVM 1201 includes physical memory array 1204. These components can be coupled to and/or placed in electrical communication with one another via suitable components, represented generally by the connection line in FIG. 12. Although not shown, other circuits such as timing sources, peripherals, voltage regulators, and power management circuits may be provided, which will not be described any further. Additional components, such as those shown in FIG. 9, may also be included with apparatus 1200.

The communication interface 1202 of the apparatus 1200 provides a means for communicating with other apparatuses over a transmission medium. In some implementations, the communication interface 1202 includes circuitry and/or programming (e.g., a program) adapted to facilitate the communication of information bi-directionally with respect to one or more devices in a system. In some implementations, the communication interface 1202 may be configured for wire-based communication. For example, the communication interface 1202 could be a bus interface, a send/receive interface, or some other type of signal interface including circuitry for outputting and/or obtaining signals (e.g., outputting signal from and/or receiving signals into a DSD).

The physical memory array 1204 may include one or more NAND blocks (1230, 1232, 1234), or other suitable NVM blocks. The physical memory array 1204 may be accessed by the processing components 1210.

In one aspect, the apparatus 1200 may also include volatile memory for storing instructions and other information to support the operation of the processing components 1210.

The apparatus 1200 includes various processing components 1210 arranged or configured to obtain, process and/or send data, control data access and storage, issue or respond to commands, and control other desired operations. For example, the components 1210 may be implemented as one or more processors, one or more controllers, and/or other structures configured to perform functions. According to one or more aspects of the disclosure, the components 1210 may be adapted to perform any or all of the features, processes, functions, operations and/or routines described herein. For example, the components 1210 may be configured to perform any of the steps, functions, and/or processes described with respect to the FIGS. included herein. As used herein, the term "adapted" in relation to components 1210 may refer to the components being one or more of configured, employed, implemented, and/or programmed to perform a particular process, function, operation and/or routine according to various features described herein. The circuits may include a specialized processor, such as an ASIC that serves as a means for (e.g., structure for) carrying out any one of the operations described, e.g., in conjunction with the FIGS. included herein. The components 1210 serve as an example of a means for processing. In various implementations, the components 1210 may provide and/or incorporate, at least in part, functionality described above for the components of controller 908 of FIG. 9 or DSD controller 1104 of FIG. 11.

According to at least one example of the apparatus 1200, the processing components 1210 may include one or more of: circuit/modules 1220 configured for determining defragmentation threshold conditions; circuits/modules 1222 configured for calculating defragmentation level metrics; and circuits/modules 1224 configured for sending defragmentation level metrics.

The physical memory array 1204 may include one or more of: blocks 1230 configured to store data/code for determining defragmentation threshold conditions; blocks 1232 configured to store data/code for calculating defragmentation level metrics; and blocks 1234 configured to store data/code for sending defragmentation level metrics.

In at least some examples, means may be provided for performing the functions illustrated in FIG. 6 and/or other functions illustrated or described herein. For example, the means may include one or more of: means, such as circuit/module 1220 for ascertaining threshold conditions that trigger a defragmentation process to be performed in a DSD; means, such as circuit/module 1222, for calculating a fragmentation level metric (e.g., an ADF) based on the threshold conditions and a current amount of data stored in an NVM, wherein the fragmentation level metric indicates a proximity of the DSD to initiating the defragmentation process; and means, such as circuit/module 1224, for sending the fragmentation level metric to a storage management device.

In the examples of the figures included herein, NAND memory is sometimes set forth as an exemplary NVM. In one aspect, the NVM may be flash memory or another suitable NVM, examples of which are noted above at the beginning of the Detailed Description section.

Additional Aspects

At least some of the processing circuits described herein may be generally adapted for processing, including the execution of programming code stored on a storage medium. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

At least some of the processing circuits described herein may be arranged to obtain, process and/or send data, control data access and storage, issue commands, and control other desired operations. The processing circuits may include circuitry configured to implement desired programming provided by appropriate media in at least one example. For example, the processing circuits may be implemented as one or more processors, one or more controllers, and/or other structure configured to execute executable programming. Examples of processing circuits may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. At least some of the processing circuits may also be implemented as a combination of computing components, such as a combination of a controller and a microprocessor, a number of microprocessors, one or more microprocessors in conjunction with an ASIC and a microprocessor, or any other number of varying configurations. The various examples of processing circuits noted herein are for illustration and other suitable configurations within the scope of the disclosure are also contemplated.

Aspects of the subject matter described herein can be implemented in any suitable NVM, including NAND flash memory such as 3D NAND flash memory. More generally, semiconductor memory devices include working memory devices, such as DRAM or SRAM devices, NVM devices, ReRAM, EEPROM, flash memory (which can also be considered a subset of EEPROM), ferroelectric random access memory (FRAM), and MRAM, and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two dimensional memory structure or a three-dimensional memory structure.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two-dimensional and three-dimensional exemplary structures described but cover all relevant memory structures within the spirit and scope of the subject matter as described herein and as understood by one of skill in the art.

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state, or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," "in one aspect," or similar language means that a particular feature, structure, or characteristic described in connection with the embodiment is included in at least one embodiment of the present disclosure. Thus, appearances of the phrases "in one embodiment," "in an embodiment," "in one aspect," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" or "one or more of A, B, or C" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "at least one of: A, B, or C" or "one or more of A, B, or C" is intended to cover A, B, C, A-B, A-C, B-C, and A-B-C, as well as multiples of the same members (e.g., any lists that include AA, BB, or CC). Likewise, "at least one of: A, B, and C" or "one or more of A, B, or C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A data storage system, comprising:
a plurality of data storage devices each comprising a non-volatile memory (NVM); and
a storage management device configured to:
receive fragmentation level information comprising fragmentation level metrics from at least two data storage devices of the plurality of data storage devices;
determine, for each data storage device of the at least two data storage devices, a frequency change metric indicative of a threshold amount of data that can be written to the respective data storage device before an expected increase in the corresponding fragmentation level metric;
receive host data from a host device to be stored in one or more of the plurality of data storage devices;
select, based on the fragmentation level information from the at least two data storage devices and the frequency change metrics, a target data storage device from the plurality of data storage devices; and
send the host data to the target data storage device.

2. The data storage system of claim 1, wherein the at least two data storage devices have different current fragmentation level metrics, and wherein the storage management device is further configured to:
identify a subset of the plurality of data storage devices having a highest current fragmentation level metric; and
refrain from selecting a data storage device included in the subset as the target data storage device.

3. The data storage system of claim 1, wherein the at least two data storage devices have different current fragmentation level metrics, and wherein the storage management device is further configured to:
identify a subset of the plurality of data storage devices having a lowest current fragmentation level metric; and
select a data storage device included in the subset as the target data storage device.

4. The data storage system of claim 1, wherein the plurality of data storage devices have a same fragmentation level metric prior to execution of a first write command and a second write command subsequent to the first write command, and wherein the storage management device is further configured to:
send the first write command to the target data storage device; and
send the second write command to a data storage device of the plurality of data storage devices other than the target data storage device.

5. The data storage system of claim 1, wherein the storage management device is further configured to:
determine a timing to request the fragmentation level metric from each of the at least two data storage devices based on the respective frequency change metric.

6. The data storage system of claim 5, wherein the storage management device is further configured to:
monitor an amount of data that has been respectively written to each of the at least two data storage devices since a most recent fragmentation level metric request for the respective data storage device; and
send a subsequent fragmentation level metric request to each of the at least two data storage devices, wherein each subsequent request is in accordance with the timing to request the fragmentation level metric and based on the monitored amount of data for the respective data storage device.

7. The data storage system of claim 1, wherein the storage management device is further configured to:
determine a defragmentation threshold associated with at least one of the at least two data storage devices configured to perform a defragmentation process responsive to a defragmentation level exceeding the defragmentation threshold; and
modify the defragmentation threshold associated with the at least one of the at least two data storage devices.

8. The data storage system of claim 7, wherein the storage management device is further configured to modify the defragmentation threshold associated with the at least one of the at least two data storage devices based on a combined storage capacity of the plurality of data storage devices.

9. The data storage system of claim 7, wherein the storage management device is further configured to modify the defragmentation threshold associated with the at least one of the at least two data storage devices based on a historical utilization of the at least one of the at least two data storage devices.

10. A method for use with a data storage system including a storage management device and a plurality of data storage devices each comprising a non-volatile memory (NVM), the method comprising:
receiving fragmentation level information comprising fragmentation level metrics from at least two data storage devices of the plurality of data storage devices;
determining, for each data storage device of the at least two data storage devices, a frequency change metric indicative of a threshold amount of data that can be written to the respective data storage device before an expected increase in the corresponding fragmentation level metric;
receiving host data from a host device to be stored in one or more of the plurality of data storage devices;
selecting, based on the fragmentation level information from the at least two data storage devices and the frequency change metrics, a target data storage device from the plurality of data storage devices; and
sending the host data to the target data storage device.

11. The method of claim 10, wherein the at least two data storage devices have different current fragmentation level metrics, and wherein the method further includes:
identifying a subset of the plurality of data storage devices having a highest current fragmentation level metric; and
refraining from selecting a data storage device included in the subset as the target data storage device.

12. The method of claim 10, wherein the at least two data storage devices have different current fragmentation level metrics, and wherein the method further includes:
identifying a subset of the plurality of data storage devices having a lowest current fragmentation level metric; and
selecting a data storage device included in the subset as the target data storage device.

13. The method of claim 10, wherein the method further includes:

determining a timing to request the fragmentation level metric from each of the at least two data storage devices based on the respective frequency change metric.

14. The method of claim 13, wherein the method further includes:
monitoring an amount of data that has been respectively written to each of the at least two data storage devices since a most recent fragmentation level metric request for the respective data storage device; and
sending a subsequent fragmentation level metric request to each of the at least two data storage devices, wherein each subsequent request is in accordance with the timing to request the fragmentation level metric and based on the monitored amount of data for the respective data storage device.

15. The method of claim 10, wherein the method further includes:
determining a defragmentation threshold associated with at least one of the at least two data storage devices configured to perform a defragmentation process responsive to a defragmentation level exceeding the defragmentation threshold; and
modifying the defragmentation threshold associated with the at least one of the at least two data storage devices.

16. The method of claim 15, wherein the method further includes modifying the defragmentation threshold associated with the at least one of the at least two data storage devices based on a combined storage capacity of the plurality of data storage devices.

17. The method of claim 15, wherein the method further includes modifying the defragmentation threshold associated with the at least one of the at least two data storage devices based on a historical utilization of the at least one of the at least two data storage devices.

18. A data storage system, comprising:
a plurality of data storage devices each comprising a non-volatile memory (NVM);
means for receiving fragmentation level information comprising fragmentation level metrics from at least two data storage devices of the plurality of data storage devices;
means for determining, for each of the at least two data storage devices, a frequency change metric indicative of a threshold amount of data that can be written to the respective data storage device before an expected increase in the corresponding fragmentation level metric;
means for selecting, based on the fragmentation level information from the at least two data storage devices and the frequency change metrics, a target data storage device from the plurality of data storage devices; and
means for sending data to the target data storage device.

19. A data storage device, comprising:
a non-volatile memory (NVM); and
one or more processors coupled to the NVM and configured, individually or in combination, to:
determine threshold conditions that trigger a defragmentation process to be performed in the data storage device;
calculate a fragmentation level metric based on the threshold conditions and a current amount of data stored in the NVM, wherein the fragmentation level metric indicates a proximity of the data storage device to initiating the defragmentation process;
send the fragmentation level metric to a storage management device;
calculate a frequency change metric, wherein the frequency change metric is indicative of a threshold amount of data that can be written to the data storage device before an expected increase in the fragmentation level metric; and
send the frequency change metric to the storage management device.

20. The data storage device of claim 19, wherein the one or more processors are further configured, individually or in combination, to store data received from the storage management device in the NVM.

\* \* \* \* \*